June 29, 1926.
A. N. CRAMER
1,590,423
GLASS FORMING MACHINE
Filed May 9, 1924     2 Sheets-Sheet 1
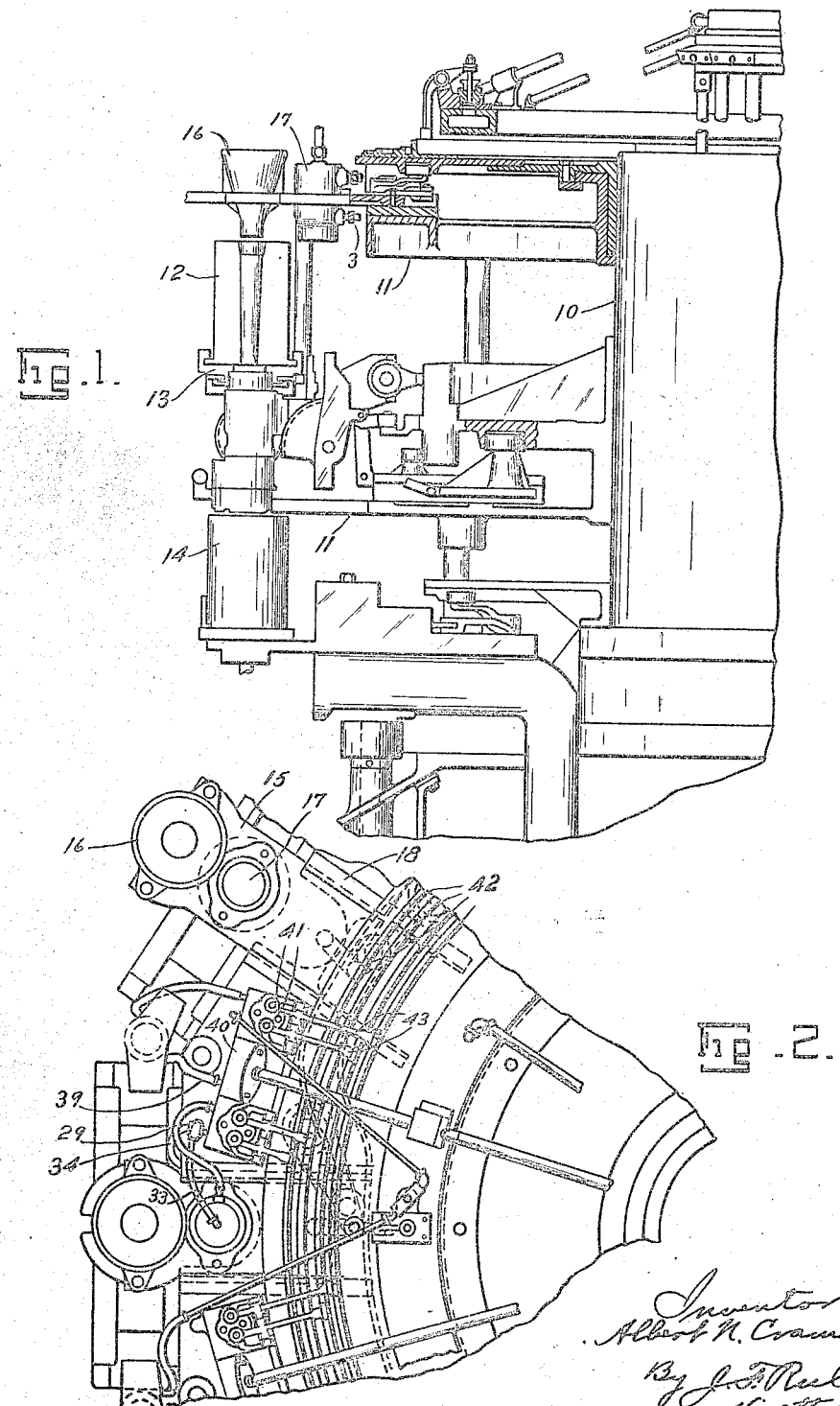

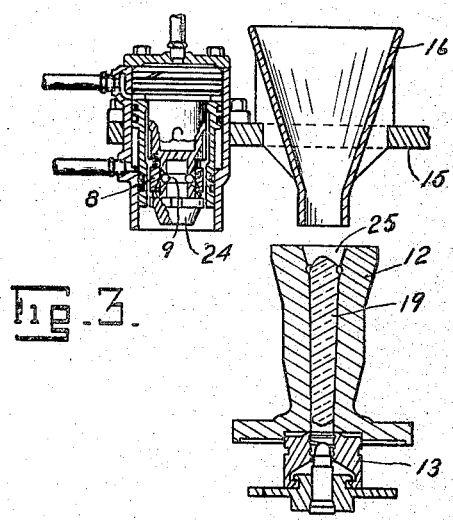
Fig. 3.
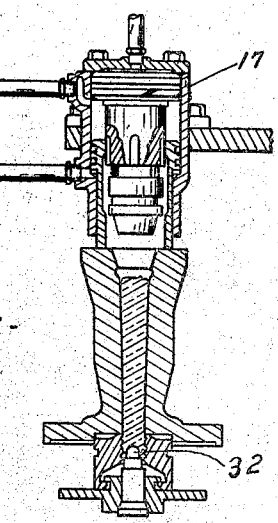
Fig. 4.
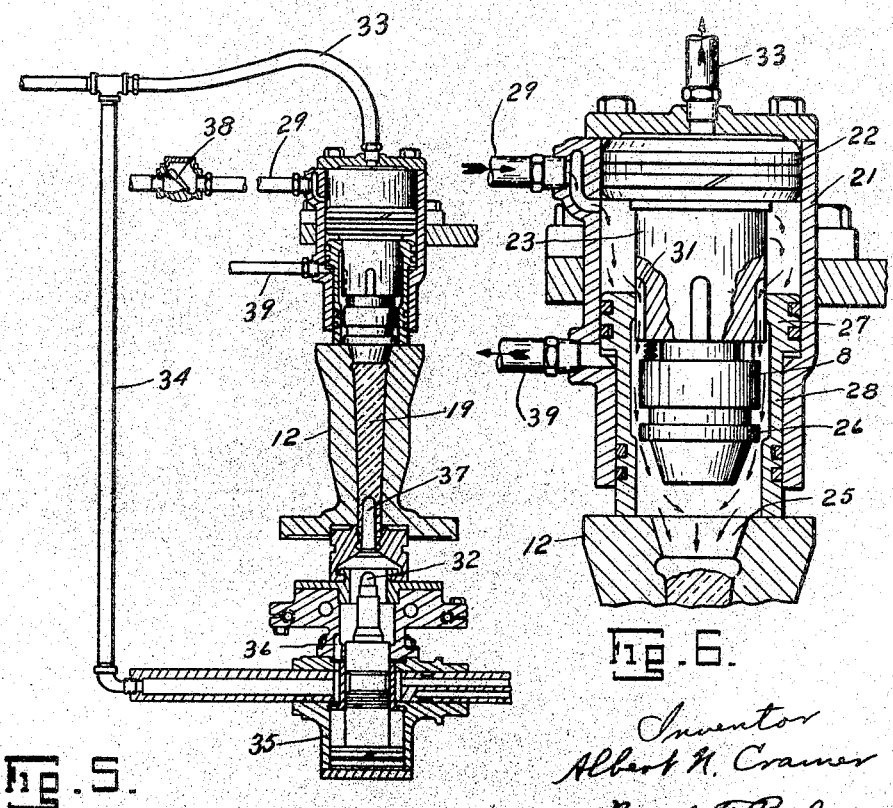
Fig. 5.
Fig. 6.
Inventor
Albert N. Cramer
By J. F. Rule,
his attorney.

Patented June 29, 1926.

1,590,423

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed May 9, 1924. Serial No. 712,140.

My invention relates to machines for forming bottles or other hollow glass articles. More specifically, it relates to a glass blowing machine of the type in which a charge of molten glass is introduced into an inverted blank mold through the open upper end of the mold, after which said end is closed by a head or plate, the blank of glass blown to the form of the mold by air supplied through the lower end of the mold, the blank mold then opened, a finishing mold closed around the blank, and the latter blown to its final form in the finishing mold.

In practice, it is found necessary to have the blank mold cavity of substantially larger volume than that of the charge of glass to enable the glass to readily and completely enter the mold. As a result, when the blank is blown up in the mold, there is formed a cavity of considerable size in the blank. In short, the blank is blown to a hollow form. When such a hollow blank is blown in the finishing mold, there is an uneven distribution of the glass in the side walls of the bottle or other blown article, which gives the finished article a wavy appearance.

I have found that by sufficiently reducing the cavity or bubble formed by blowing the blank in the blank mold, this waviness or uneven distribution of the glass in the finished article can be practically eliminated. In order to effect such a result, the present invention provides a blowing head constructed and adapted to close the upper end of the blank mold and supply air under pressure to compact the blank in the mold, in combination with a plug or head of a size and shape to enter the upper end of the blank mold cavity and thereby reduce the space left for expansion of the glass in the mold.

Other features of the invention will appear hereinafter. Certain features herein set forth are disclosed and claimed in my co-pending application, Serial Number 431,070, filed December 16, 1920.

In the accompanying drawings:

Figure 1 is a part sectional elevation of a portion of a bottle blowing machine embodying the present invention.

Figure 2 is a top plan view of the same.

Figure 3 is a sectional elevation of a blank mold, funnel guide and blowing head, the blowing head being moved to one side of the mold.

Figure 4 is a similar view showing the blowing head brought to position over the mold, the parts being in position for blowing air downward to compact glass in the mold.

Figure 5 is a view similar to Figure 4, but with the parts in position for blowing air upward through the neck mold.

Figure 6 is a view similar to Figure 4, on a larger scale, a portion of the mold being broken away.

Refering particularly to Figures 1 and 2, the machine comprises a stationary central column 10 around which the mold carriage 11 rotates. Mounted on the carriage are units, each comprising a body blank mold 12, a neck mold 13, a finishing mold 14, and mechanism for opening and closing the molds and performing other operations incident to the fabrication of the bottles.

Above each blank mold is a plate 15 carrying a funnel guide 16 and a blowing head 17. The plate 15 is mounted to slide radially of the mold carriage in guides 18 to bring the funnel and blowing head alternatively to a position over the blank mold. As the mold carriage rotates, the blank molds are brought successively beneath a charger and a charge of glass 19 (Fig. 3) is dropped through the guide 16 into the mold. The plate 15 is then moved radially outward to bring the blowing head over the mold.

The blowing head comprises a cylinder 21 in which works a piston 22. Depending from the piston 22 is a cylindrical core or extension 23, to the lower end of which is connected a mold capacity reducing member herein shown as a plug or head 24 adapted to enter the upper end of the opening 25 of the blank mold cavity. The plug 24 is preferably removably secured to the part 23 in any approved manner, the connecting means herein shown comprising balls 9 (Fig. 3) which engage an annular groove in the stem 7 of the plug 24 and are held in position by a sleeve 8. The walls of the opening 25 are preferably tapered to assist in guiding the glass into the mold, and the head 24 is correspondingly tapered and formed with an annular shoulder 26 to seat on the mold. Surrounding the core 23 is an annular piston 27 formed with a cylindrical downward extension 28. When the blowing head is moved to a position over the mold, as above noted, air under pressure is admitted through a pipe 29 to the cylinder 21 between the pistons 22 and 27. The piston 27 is thereby moved downward until the extension 28 rests on the mold. This opens passageways or channels 31 past the piston 27, thereby permitting the air from the pipe 29 to pass downward as indicated by the arrows in Figure 6 and apply pressure on the glass. This compacts the glass in the blank mold and neck mold and forms the neck of the bottle. At this time, the neck mold plunger 32 is in its upward position (Fig. 4) so as to form an initial blow opening in the blank.

A pipe 33 leading from the upper end of the cylinder 21 is open to atmospheric pressure during the above blowing operation. This pipe 33 is now connected to the air pressure so that the piston 22 is forced downward, causing the head 24 to enter and close the mold cavity, as shown in Figure 5. At the same time, the air pressure is admitted through a branch pipe 34 to the cylinder of a piston motor 35 (Fig. 5) which thereby withdraws the plunger 32. Air is also admitted through ports 36 to the neck mold, so that the glass is expanded or blown in the blank mold. As the head 24 when it enters the blank mold fills up most of the vacant space above the blank, there is but little room for expansion of the glass, so that the air space or cavity 37 (Fig. 5) in the blank mold is quite small. In other words, the blank 19 is solid throughout the greater portion of its length. When a blank of this form is blown in the finishing mold, there is an even distribution of the glass in the side walls of the blown article, so that the glass is free from the waviness characteristic of an article blown from a hollow blank.

A check valve 38 (Fig. 5) prevents the escape of air through the pipe 29 while pressure is maintained in the pipe 33. After the blank has been blown, the pipe 33 is again opened to the atmosphere and air pressure supplied through a pipe 39 beneath the piston 27 so that the latter is raised, carrying with it the piston 22 and thereby restoring the parts of the blowing head to the Figure 3 position. The blank mold is now opened, leaving the bare blank supported in the neck mold which is then inverted to swing the blank downward. The finishing mold 14 now closes around the blank which is blown therein to its finished form.

The air supply to the blowing head through the pipes, 29, 33 and 39, is controlled from a valve box 40, having valves 41 actuated by a series of stationary cams 42 on the mold carriage. These cams operate the valves through levers 43. The construction and operation of the valves 41 and their actuating mechanism may be substantially the same as like parts disclosed, for example, in co-pending application, Serial Number 532,606, filed January 30, 1922, the particular construction of such mechanism forming no part of the present invention.

Modifications may be resorted to within the spirit and scope of my invention.

What I claim is:

1. In a glass blowing machine, the combination of a mold open at its upper end to receive a charge of glass, means to apply air under pressure to the open end of the mold and thereby compact the glass in the mold, said means having means to cushion the impact thereof with the mold and formed with channelways for conducting air to the mold after impact, a mold closing device comprising a plug having an external diameter less than the diameter of the mold cavity, means to cause the plug to enter the upper end of the mold after the glass has been compacted therein, and means to supply air pressure through the opposite end of the mold and blow the glass therein.

2. In a glass blowing machine, the combination of a mold open at its upper end to receive a charge of glass, means to apply air under pressure to the open end of the mold and thereby compact the glass in the mold, means associated with the said means to make a yieldable connection therewith and the mold, and being formed with conduits for conducting air to the mold after the connection is made, a mold closing device comprising a plug having an external diameter less than said mold, means to cause the plug to enter the upper end of the mold after the glass has been compacted therein, means to supply air pressure through the opposite end of the mold and blow the glass therein, and a finishing mold to which the blank of glass is transferred and in which the blank is blown to finished form.

3. In a glass blowing machine, the combination of a blank mold open at its upper end to receive a charge of glass, a blowing head movable into register with the upper end of the mold, air operated means for causing a tight contact between the mold and said blowing head and simultaneously causing said air to enter the mold, means to supply air pressure through said head to compact the glass in the mold, means to then reduce the air space within the mold, and means to blow the glass through the opposite end of the mold after said space has been reduced.

4. In a glass blowing machine, the combination of a blank mold open at its upper end to receive a charge of glass, means for supplying air under pressure through said end of the mold to compact the glass therein, compressed air means for effecting a tight connection between the mold and the said means and deadening the jar between said parts upon impact, said means simultaneously with the impact effecting a discharge of said air to the mold, a filling plug to enter said end of the mold, and means to supply air through the opposite end of the mold and blow the glass while said filling plug is in the mold 5. In a glass blowing machine, the combination of a blank mold open at its upper end to receive a charge of glass, a blowing head movable over and into register with the mold, means to bring said blowing head into contact therewith and comprising an air cushion to reduce the jar between said parts upon impact, said means formed with channelways for filling the mold with air after the said contact is made, and a mold capacity reducing member carried by said head and movable into the mold.

6. In a glass blowing machine, the combination of a blank mold open at its upper end to receive a charge of glass, a blowing head movable into engagement with the mold, a piston in said head, and a mold capacity reducing element carried by said piston and movable thereby into the mold.

7. In a glass blowing machine, the combination of a blank mold open at its upper end to receive a charge of glass, a blowing head movable into engagement with the mold, a piston in said head, a plug carried by said piston and movable thereby into position to enter the mold cavity and close the end of the mold, and means for supplying air pressure through the lower end of the mold.

8. In a glass blowing machine, the combination of a blank mold open at its upper end to receive a charge of glass, a blowing head movable into and out of engagement with said end of the mold, means for supplying air pressure through said head to compact the glass in the mold, a piston within said head, and a mold closing plug carried by the piston and movable thereby into position to enter the mold cavity, said plug being shaped to fill and close the upper portion of the mold cavity.

9. In a glass blowing machine, the combination of a blank mold open at its upper end to receive a charge of glass, a head comprising a cylindrical casing, a piston therein, a stem depending from the piston, a sleeve member within said casing and having a telescoping connection therewith, said member movable into and out of engagement with the mold, and a plug carried by said stem adapted to enter the mold cavity.

10. In a glass blowing machine, the combination of a blank mold open at its upper end to receive a charge of glass, a head comprising a cylindrical casing, a piston therein, a stem depending from the piston, a sleeve member within said casing and having a telescoping connection therewith, an annular piston carrying said sleeve member and surrounding said stem, means for supplying air under pressure between said pistons, thereby moving the sleeve member into engagement with the mold and supplying air pressure to the mold, means to supply air pressure above the first mentioned piston, to actuate it and cause said plug to enter and close the upper end of the mold, and means for supplying air through the lower end of the mold for expanding the glass therein.

11. A glass blowing machine comprising, in combination, a mold open at one end to receive a charge of glass, a blowing head movable into position to supply air pressure at said open end of the mold, means associated with said blowing head to cushion the impact between said blowing head and mold, said means formed with channels for conducting air to the mold after said impact, and a mold capacity reducing device carried by said head.

12. A glass blowing machine comprising, in combination, a mold open at one end to receive a charge of glass, a blowing head movable into position to supply air pressure at said open end of the mold, fluid pressure means to make a cushioned contact of the blowing head with the said mold, and a mold capacity reducing device within said head and movable therein into position to enter said end of the mold.

13. A glass blowing machine comprising, in combination, a mold open at one end to receive a charge of glass, a motor comprising a cylinder and piston, a plug carried by the piston and moved thereby into and out of said open end of the mold, and a second piston providing means for establishing a cushioned contact between the said mold and the said motor.

14. A glass blowing machine comprising, in combination, a mold open at one end to receive a charge of glass, a motor comprising a cylinder and piston, a plug carried by the piston and moved thereby into and out of said open end of the mold, and means for directing air under pressure through said cylinder into the mold.

15. A glass blowing machine comprising, in combination, a mold open at one end to receive a charge of glass, a motor comprising a cylinder and piston, a plug carried by the piston and moved thereby into and out of said open end of the mold, means for supplying air under pressure to said cylinder and directing it into the mold, and means for supplying air pressure to actuate said piston.

16. A glass blowing machine comprising, in combination, a rotary mold carriage, a blank mold thereon, a blowing head, a carrier on which said head is mounted, said carrier shiftable on the mold carriage to move said head into and out of a position over the mold, means for supplying air under pressure through said head to the mold, and a plug carried by said head and movable into and out of said open end of the mold.

17. A glass blowing machine comprising, in combination, a rotary mold carriage, a blank mold thereon, a blowing head, a carrier on which said head is mounted, said carrier shiftable on the mold carriage to move said head into and out of a position over the mold, means for supplying air under pressure through said head to the mold, a mold closing plug mounted in said head, and means to move said plug downwardly and cause it to enter the mold cavity after said supply of air to the mold.

18. A glass blowing machine comprising, in combination, a rotary mold carriage, a blank mold thereon, a blowing head, a carrier on which said head is mounted, a funnel guide on said carrier, means to shift the carrier radially of the mold carriage, to bring said guide and blowing head alternatively into a position over the mold, a plug carried by said blowing head, and means to move the plug vertically downward into the mold.

Signed at Toledo, in the county of Lucas and State of Ohio, this 7th day of May, 1924.

ALBERT N. CRAMER.